United States Patent
Ogura (10) Patent No.: US 9,646,545 B2
(45) Date of Patent: *May 9, 2017

(54) DISPLAY DEVICE

(71) Applicant: PANASONIC INTELLECTUAL PROPERTY MANAGEMENT CO., LTD., Osaka (JP)

(72) Inventor: Motonari Ogura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,403

(22) Filed: Aug. 17, 2016

(65) Prior Publication Data
US 2016/0358555 A1    Dec. 8, 2016

Related U.S. Application Data

(63) Continuation of application No. 13/676,500, filed on Nov. 14, 2012, now Pat. No. 9,443,475, which is a
(Continued)

(30) Foreign Application Priority Data

Sep. 28, 2010    (JP) .................................. 2010-216445

(51) Int. Cl.
*G09G 3/34* (2006.01)
*H04N 5/64* (2006.01)
(Continued)

(52) U.S. Cl.
CPC ..... *G09G 3/3406* (2013.01); *G02F 1/133308* (2013.01); *G09G 3/36* (2013.01);
(Continued)

(58) Field of Classification Search
CPC ... G02F 2001/133314; G02F 1/133308; G02F 2001/133325; G02F 2001/13332;
(Continued)

(56) References Cited

U.S. PATENT DOCUMENTS

2004/0109104 A1    6/2004    Lee
2004/0160547 A1    8/2004    Watanabe
(Continued)

FOREIGN PATENT DOCUMENTS

CN    1573454 A    2/2005
CN    1598660 A    3/2005
(Continued)

OTHER PUBLICATIONS

International Search Report mailed Dec. 20, 2011 issued in corresponding International Application No. PCT/JP20111/005332.
(Continued)

*Primary Examiner* — Alexander Eisen
*Assistant Examiner* — Abhishek Sarma
(74) *Attorney, Agent, or Firm* — McDermott Will & Emery LLP (57) ABSTRACT

Back cabinet has space which can accommodate backlight unit and a circuit board therein, a backlight supporter which supports backlight unit is provided on an inner wall surface forming space, liquid crystal display panel is disposed in an opening of space of back cabinet, and panel driving circuit board for electrically connecting liquid crystal display panel to a signal processing circuit board is exposed to outside from a side wall of back cabinet.

4 Claims, 9 Drawing Sheets

Related U.S. Application Data continuation of application No. PCT/JP2011/005332, filed on Sep. 22, 2011.

(51) Int. Cl.
*G02F 1/1333* (2006.01)
*G09G 3/36* (2006.01)

(52) U.S. Cl.
CPC ..... *H04N 5/64* (2013.01); *G02F 2001/13332* (2013.01); *G02F 2001/133314* (2013.01); *G02F 2001/133325* (2013.01); *G02F 2201/46* (2013.01)

(58) Field of Classification Search
CPC .... G02F 2201/46; H04N 5/64; G09G 3/3406; G09G 3/36
See application file for complete search history.

(56) References Cited

U.S. PATENT DOCUMENTS

| | | |
|---|---|---|
| 2005/0018102 A1 | 1/2005 | Hirano |
| 2005/0052587 A1 | 3/2005 | Kitada et al. |
| 2005/0094052 A1 | 5/2005 | Sakurai et al. |
| 2006/0061704 A1 | 3/2006 | Hayano et al. |
| 2006/0119761 A1 | 6/2006 | Okuda |
| 2006/0152101 A1 | 7/2006 | Nagahama |
| 2006/0170839 A1 | 8/2006 | Yamamoto et al. |
| 2007/0133158 A1 | 6/2007 | Oda et al. |
| 2008/0079864 A1 | 4/2008 | Nishimura |
| 2008/0291356 A1 | 11/2008 | Kim |
| 2009/0140963 A1 | 6/2009 | Okumura et al. |
| 2013/0192055 A1 | 8/2013 | Sasaki et al. |

FOREIGN PATENT DOCUMENTS

| | | |
|---|---|---|
| CN | 1697996 A | 11/2005 |
| CN | 1749830 A | 3/2006 |
| CN | 1811543 A | 8/2006 |
| CN | 103201782 A | 7/2013 |
| JP | 2001-109390 A | 4/2001 |
| JP | 2004-126287 A | 4/2004 |
| JP | 2007-163861 A | 6/2007 |
| JP | 2008-083584 A | 4/2008 |
| JP | 2008-310181 A | 12/2008 |
| JP | 2009-139426 A | 6/2009 |
| JP | 2009-151112 A | 7/2009 |

OTHER PUBLICATIONS

English Translation of Chinese Search Report dated Feb. 6, 2015 for the related Chinese Patent Application No. 201180035198.1.
U.S. Office Action issued in U.S. Appl. No. 13/676,500 dated Jun. 16, 2014.
U.S. Office Action issued in U.S. Appl. No. 13/676,500 dated Nov. 4, 2014.
U.S. Office Action issued in U.S. Appl. No. 13/676,500 dated Apr. 2, 2015.
U.S. Office Action issued in U.S. Appl. No. 13/676,500 dated Jul. 28, 2015.
U.S. Notice of Allowance issued in U.S Appl. No. 13/676,500 dated Aug. 23, 2016.

DISPLAY DEVICE

RELATED APPLICATIONS

This application is a continuation application of U.S. application Ser. No. 13/676,500, filed on Nov. 14, 2012, which is a continuation application of International Application No. PCT/JP2011/005332, filed on Sep. 22, 2011, which in turn claims the benefit of Japanese Application No. 2010-216445, filed on Sep. 28, 2010, the disclosures of which Applications are incorporated by reference herein.

TECHNICAL FIELD

The instant application relates to a flat display device such as a liquid crystal display device used for a television receiver or a monitor device.

BACKGROUND

A liquid crystal display device is a flat display device, and demands thereof have increased for general homes and business use.

Generally, the liquid crystal display device includes a display module which is configured by disposing a backlight unit which is a surface light source on a back surface side of a flat liquid crystal display panel, and the display module is accommodated inside a thin casing including a front cabinet and a back cabinet (refer to PTL 1)

In addition, the liquid crystal display device is produced as follows by a panel manufacturer and a finished product manufacturer.

The panel manufacturer manufactures liquid crystal display panels which are supplied to the finished product manufacturer such as a television manufacturer.

The finished product manufacturer combines a backlight unit which is a surface light source with the liquid crystal display panel, thereby manufacturing a display module. In addition, the display module is accommodated in a thin casing including a front cabinet and a back cabinet along with a driving circuit board of the liquid crystal display panel.

In this way, the liquid crystal display device is produced.

In addition, a finished product manufacturer builds a factory for assembling products at an area in which liquid crystal display device are sold or an area close to the area, and finished products having designs and functions corresponding to the sales area are assembled and sold.

Along with the increase in demand for liquid crystal display devices in the whole world, there are requests for reduction in the number of assembling steps when a finished product is assembled and for ease of assembly, and there is a request for simplicity of a packaging method in a case of transporting display modules or the like to a factory for performing assembly.

CITATION LIST

Patent Literature

PTL 1: Unexamined Japanese Patent Publication No. 2009-139426

SUMMARY

According to the instant application, a display device includes a casing having a back cabinet; a flat display panel installed in the casing; a backlight unit disposed on a back side of the flat display panel; a circuit board forming a driving circuit for displaying an image on the flat display panel; and a wire member electrically connecting the circuit board to the flat display panel, wherein the back cabinet has a space which can accommodate the backlight unit and the circuit board therein, and a backlight supporter which supports the backlight unit on an inner wall surface forming the space, and wherein the flat display panel is disposed in an opening of the space of the back cabinet, and a connector between the flat display panel and the wire member is exposed to the outside from a side wall of the back cabinet.

DESCRIPTION OF EMBODIMENTS

Hereinafter, a display device according to an embodiment of the instant application will be described with reference to the drawings by exemplifying a liquid crystal display device.

Figure 1:
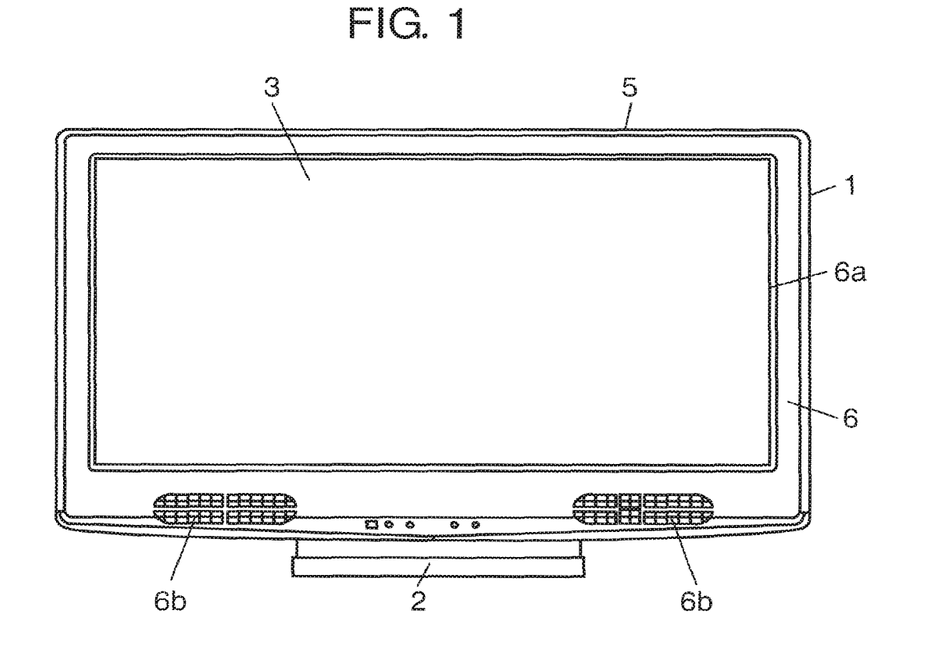
FIG. 1 is a front view of a liquid crystal display device which is a display device according to an embodiment of the instant application.
Figure 2:
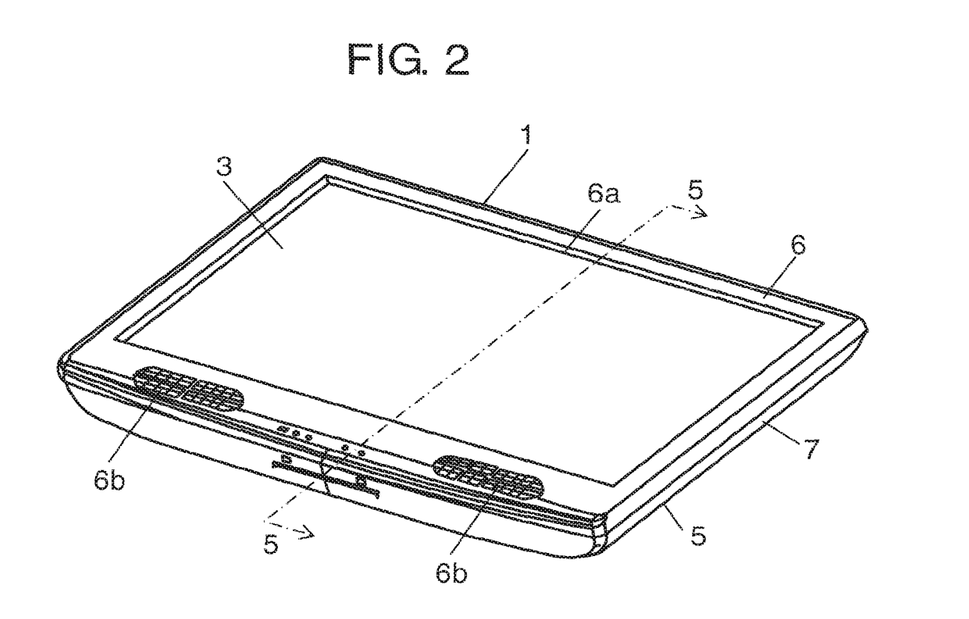
FIG. 2 is a perspective view of the liquid crystal display device illustrating a state where the stand is detached.
Figure 3:
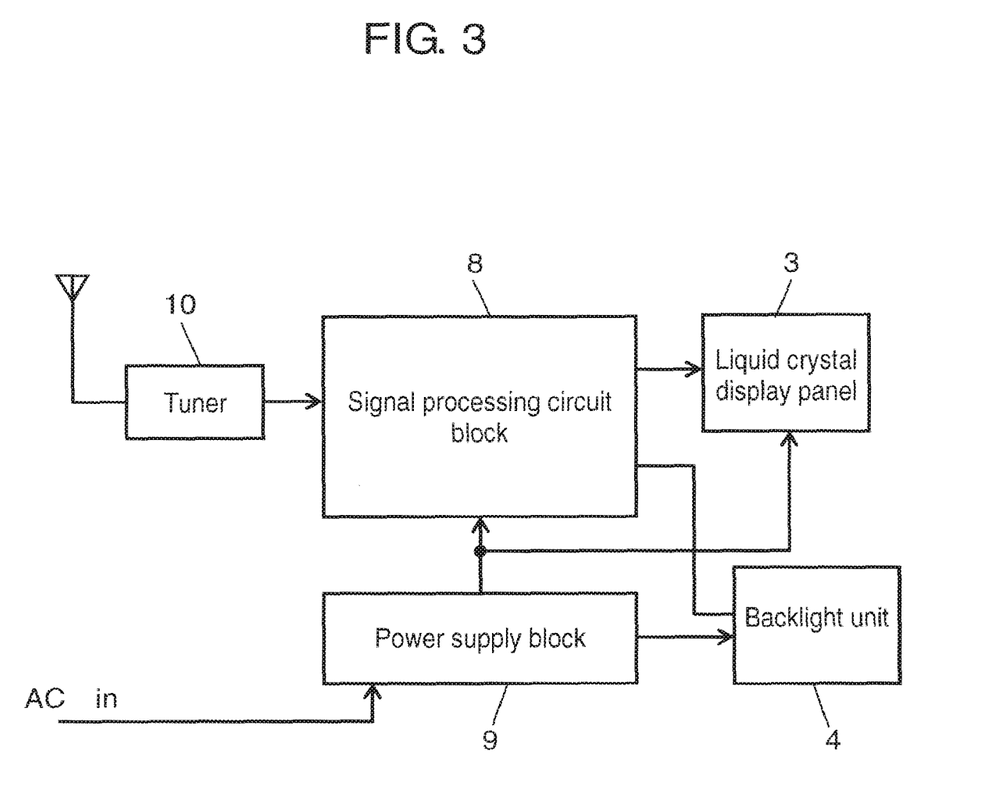
FIG. 3 is a block diagram illustrating a circuit block of the entire configuration of the liquid crystal display device.
Figure 4:
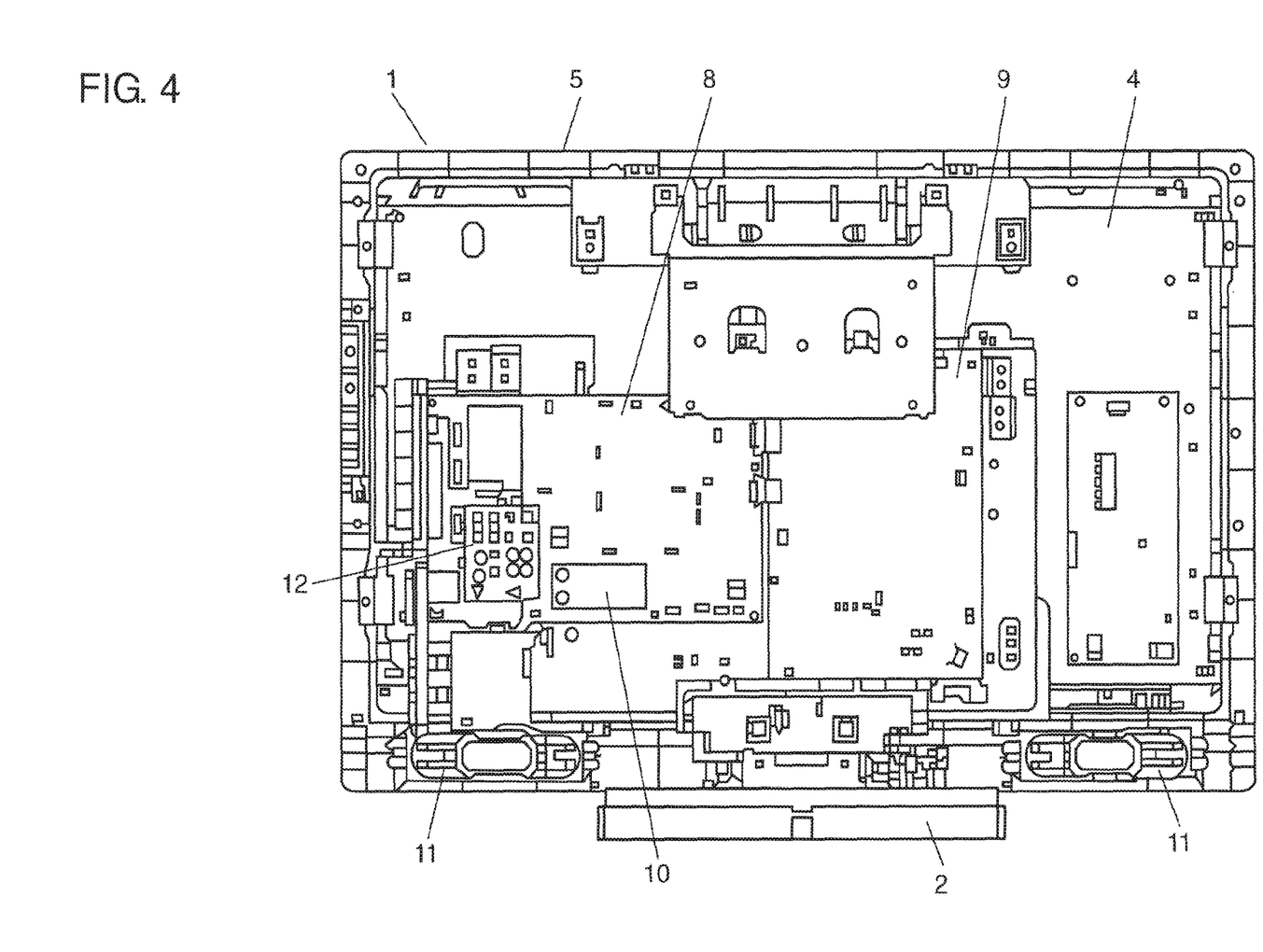
FIG. 4 is a plan view of the liquid crystal display device from which a back cabinet is removed.
Figure 5:
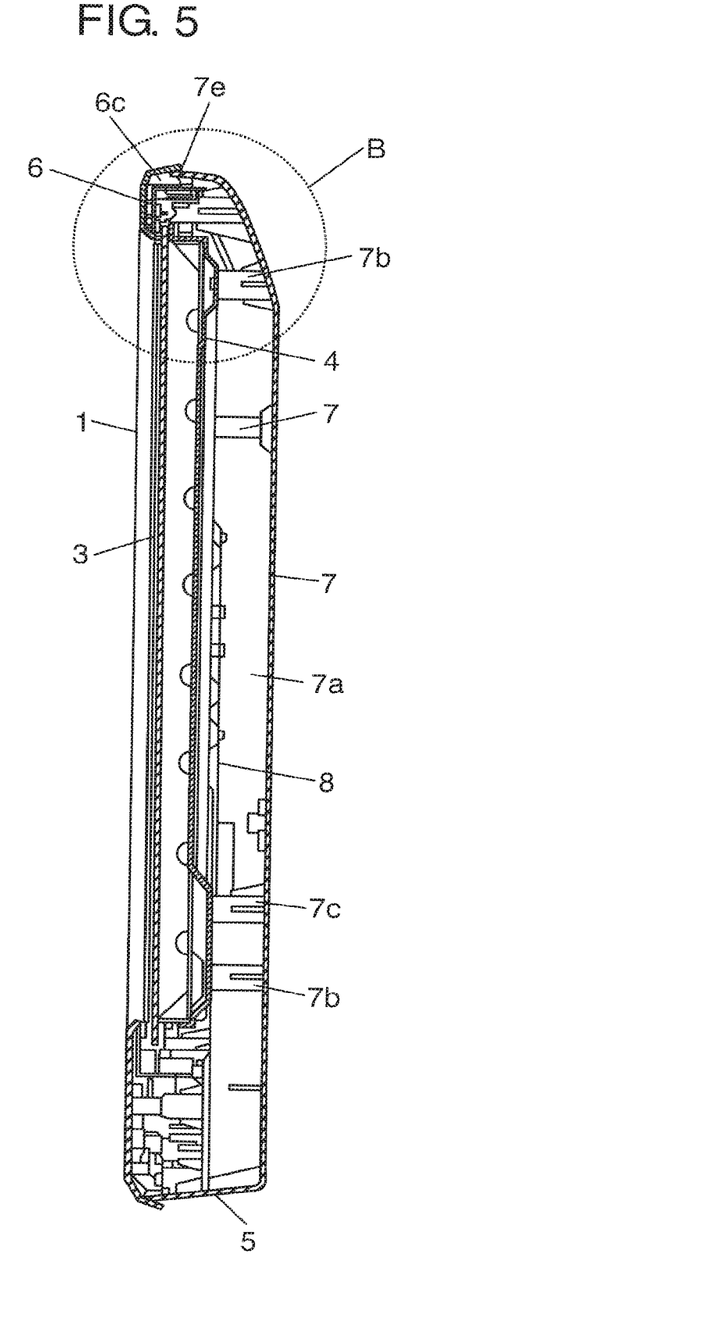
FIG. 5 is a cross-sectional view of the liquid crystal display device taken along line 5-5 in FIG. 2.
Figure 6:
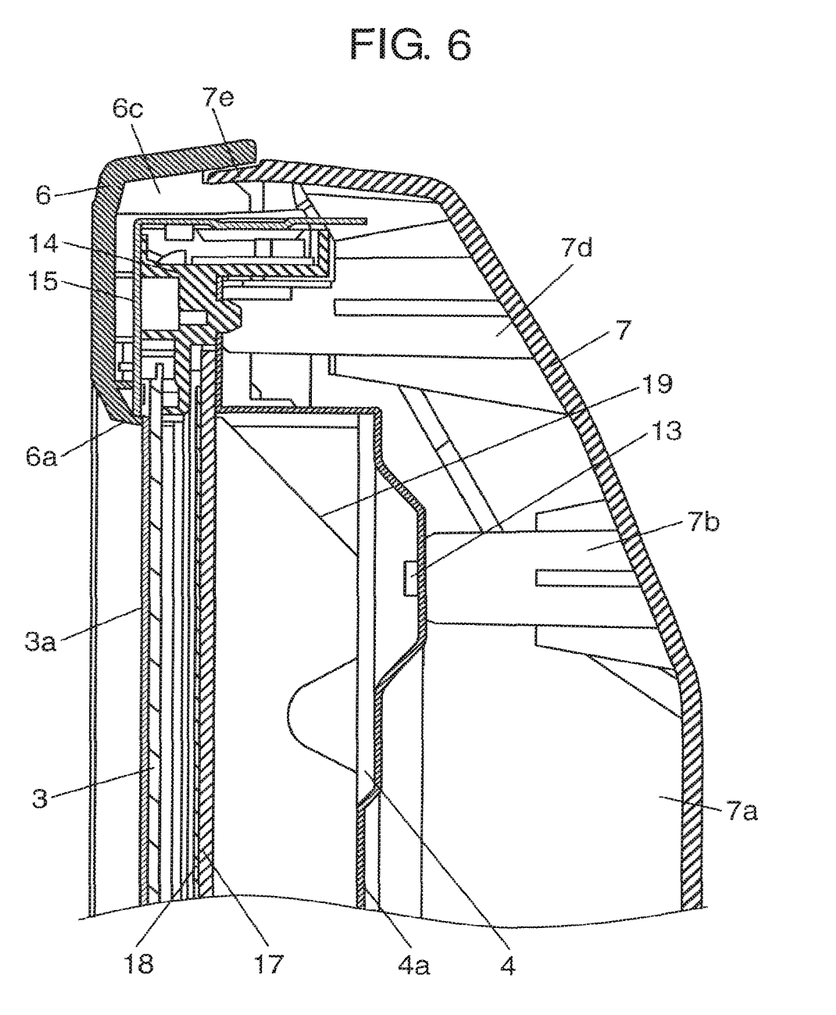
FIG. 6 is an enlarged view of a portion B of the liquid crystal display device in FIG. 5.
Figure 7:
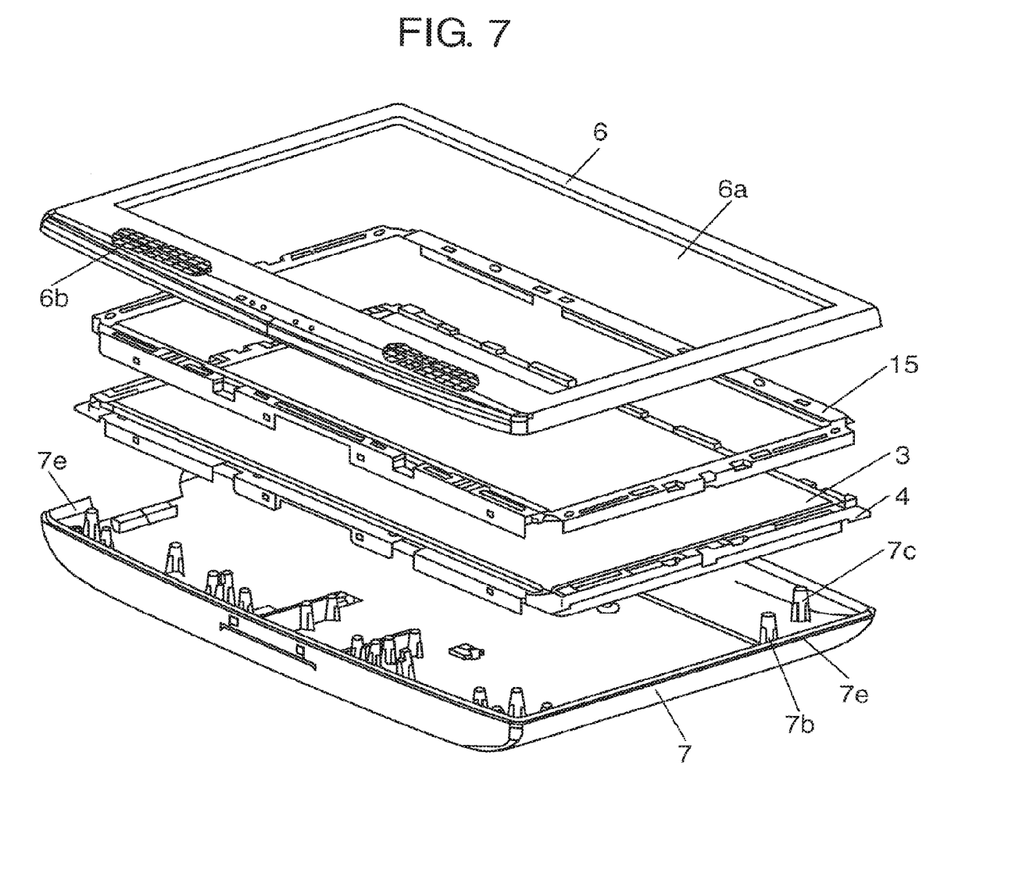
FIG. 7 is an exploded perspective view of the liquid crystal display device.

FIG. 1 is a front view of a liquid crystal display device which is a display device according to an embodiment of the instant application; FIG. 2 is a perspective view of the liquid crystal display device illustrating a state where the stand is detached; FIG. 3 is a block diagram illustrating a circuit block of the entire configuration of the liquid crystal display device; FIG. 4 is a plan view of the liquid crystal display device from which a back cabinet is removed; FIG. 5 is a cross-sectional view of the liquid crystal display device taken along line 5-5 in FIG. 2; FIG. 6 is an enlarged view of a portion B of the liquid crystal display device in FIG. 5; and FIG. 7 is an exploded perspective view of the liquid crystal display device.

First, as illustrated in FIGS. 1 and 2, the liquid crystal display device includes display device main body 1, and stand 2 which holds display device main body 1 in a standing state. Display device main body 1 is configured by accommodating a display 1 nodule having liquid crystal display panel 3 which is a flat display panel and backlight unit 4 (illustrated in FIG. 5) in casing 5 formed of a resin molded product. In addition, casing 5 includes front cabinet 6 which is provided with opening 6a so as to correspond to an image display region of liquid crystal display panel 3, and back cabinet 7 combined with front cabinet 6. In addition, the reference numeral 6b indicates a speaker grill for emitting the sound of a speaker to outside.

In addition, as illustrated in FIGS. 3 and 4, a schematic configuration of the entire liquid crystal display device includes a signal processing circuit block 8 which has a driving circuit displaying an image on liquid crystal display panel 3 and a lighting control circuit controlling lighting of the backlight unit 4, power supply block 9 which supplies power to liquid crystal display panel 3, backlight unit 4, and signal processing circuit block 8, tuner 10 which receives television broadcasting and supplies a received signal to the signal processing circuit block 8, and speaker 11 which outputs sound. Signal processing circuit block 8 and power supply block 9 respectively have components forming circuits mounted on circuit boards. Further, a circuit board which has signal processing circuit block 8, power supply block 9, tuner 10, and the like mounted thereon is installed so as to be disposed in a space between a back face of backlight unit 4 and back cabinet 7.

In addition, as illustrated in FIG. 4, signal processing circuit block 8 is equipped with external signal input terminals 12 used to input a video signal from an external device such as a DVD player to the liquid crystal display device. Further, a speaker is not illustrated in FIG. 3. Here, as illustrated in FIGS. 5 to 7, back cabinet 7 has a space 7a in which the display module including liquid crystal display panel 3 and backlight unit 4, and the circuit board can be accommodated. Further, an inner bottom surface forming space 7a is provided with backlight supporters 7b and 7c supporting backlight unit 4. Of backlight supporters 7b and 7c, frame 4a of backlight unit 4 is installed at backlight supporter 7b using screw 13.

Further, panel supporter 7d which is a resin molded product that supports an outer circumference of liquid crystal display panel 3 and holds panel supporting member 14 is provided in the circumference of the inner bottom surface of back cabinet 7. In addition, the outer circumference of liquid crystal display panel 3 is supported by panel supporting member 14. The outer circumference of liquid crystal display panel 3 is pressed against panel supporting member 14 by frame 15 which is made of metal and has a cross-sectional shape of a substantially L shape. By this pressing, liquid crystal display panel 3 is accommodated and disposed in the opening circumference of space 7 a of back cabinet 7. In addition, the reference numeral 3a indicates a polarization film attached to a display surface of liquid crystal display panel 3.

Here, liquid crystal display panel 3 disposed in the opening of space 7a of back cabinet 7 is electrically connected to the circuit board corresponding to signal processing circuit block 8 disposed on the back side of backlight unit 4 via a flexible wire board corresponding to a wire member which is disposed along the outer circumference of backlight unit 4. A detailed structure thereof will be described later.

Figure 8:
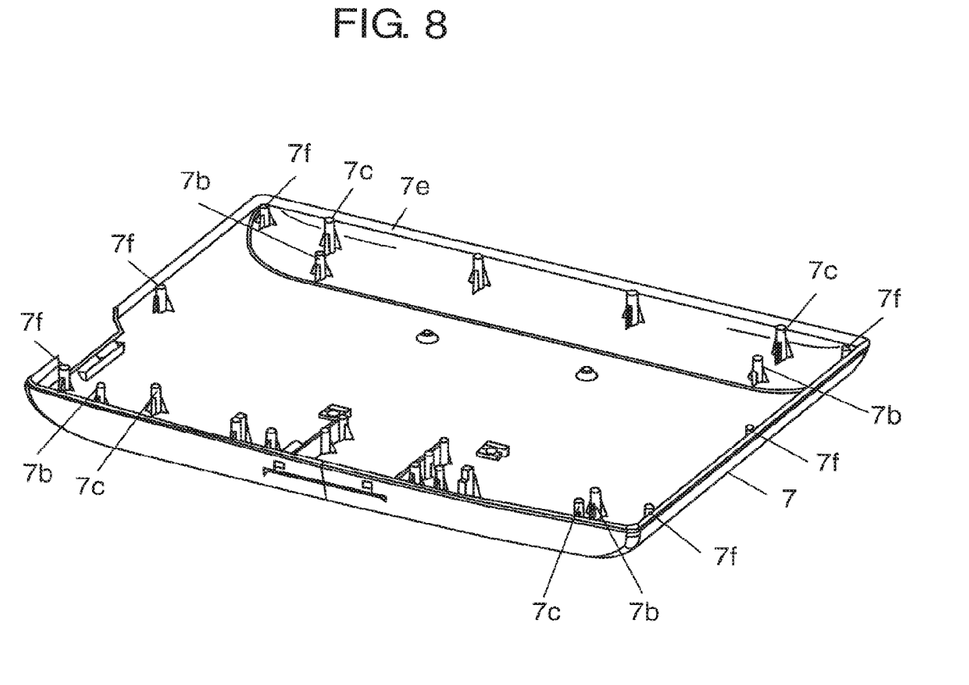
FIG. 8 is a perspective view of a back cabinet on an inner wall surface side of the liquid crystal display device.

In addition, as illustrated in FIG. 6, outer circumferential front end 7e of back cabinet 7 is fitted to fitting piece 6c provided on the inner circumferential wall surface of front cabinet 6. Further, front cabinet 6 is installed in back cabinet 7 using screws from the front cabinet 6 side, and thereby the circuit board having the display module and the driving circuits thereon is accommodated in the casing. FIG. 8 is a perspective view of the back cabinet of the inner wall surface side of the liquid crystal display device, and front cabinet 6 is installed at bosses 7f provided in the outer circumference of back cabinet 7 using screws.

Figure 9:
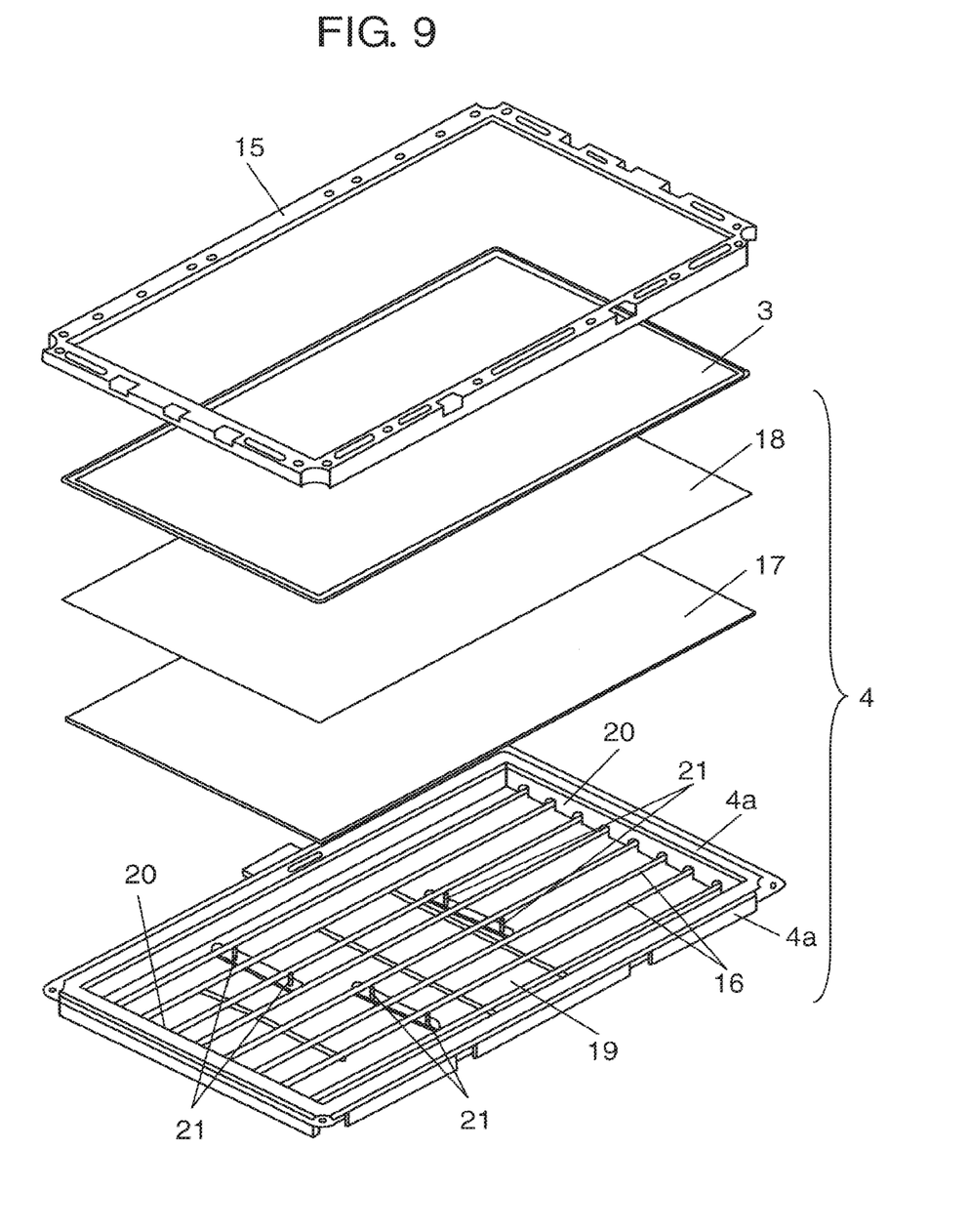
FIG. 9 is an exploded perspective view of a display module of the liquid crystal display device.

FIG. 9 is an exploded perspective view of the display module of the liquid crystal display device. As illustrated in FIG. 9, backlight unit 4 illuminates liquid crystal display panel 3 from the back side. Backlight unit 4 includes a plurality of linear light sources 16 arranged in parallel to liquid crystal display panel 3 in frame 4a and diffusion plate 17 covering frame 4a.

Optical sheet 18 such as a prism sheet which diffuses or collects light passing through diffusion plate 17 is laminated on diffusion plate 17.

Reflection sheet 19 which is formed of a metal foil and reflects light emitted from linear light sources 16 toward diffusion plate 17 is disposed on the inner bottom surface of frame 4a so as to entirely cover the inner bottom surface. In addition, a pair of supporting members 20 which are spaced apart from each other in the extending direction of the linear light sources 16 and hold linear light sources 16 are disposed. Here, as linear light sources 16, tubular cold cathode fluorescent lamps (CCFLs) are used and are arranged in parallel to each other. In addition, both ends of linear light sources 16 are covered by supporting members 20. Further, frame 4a is made of metal, such as iron or aluminum, or resin. Frame 4a has a box shape which is open in one direction, and has a bottom wall forming a bottom surface parallel to the arranged surface of linear light sources 16 and a side wall rising from the circumference of the bottom wall. Furthermore, a plurality of diffusion plate supporting members 21 supporting diffusion plate 17 are disposed on the inner bottom surface of frame 4a.

Diffusion plate 17 is disposed between linear light sources 16 and liquid crystal display panel 3. Diffusion plate 17 makes light which is incident from an incidence surface of linear light sources 16 side diffused so as to be emitted from an exit surface of the liquid crystal display panel 3 side, and is formed through injecting molding of a transparent resin such as polystyrene or polycarbonate.

Specifically, as illustrated in FIG. 9, diffusion plate 17 is disposed opposite to reflection sheet 19 with linear light sources 16 interposed therebetween. This diffusion plate 17 has an incidence surface which makes direct light from linear light sources 16 and reflected light from reflection sheet 19 incident to the inside thereof and an exit surface which emits light diffused in the inside.

The above-described optical sheet 18 IS disposed so as to be laminated on the exit surface.

Figure 10:
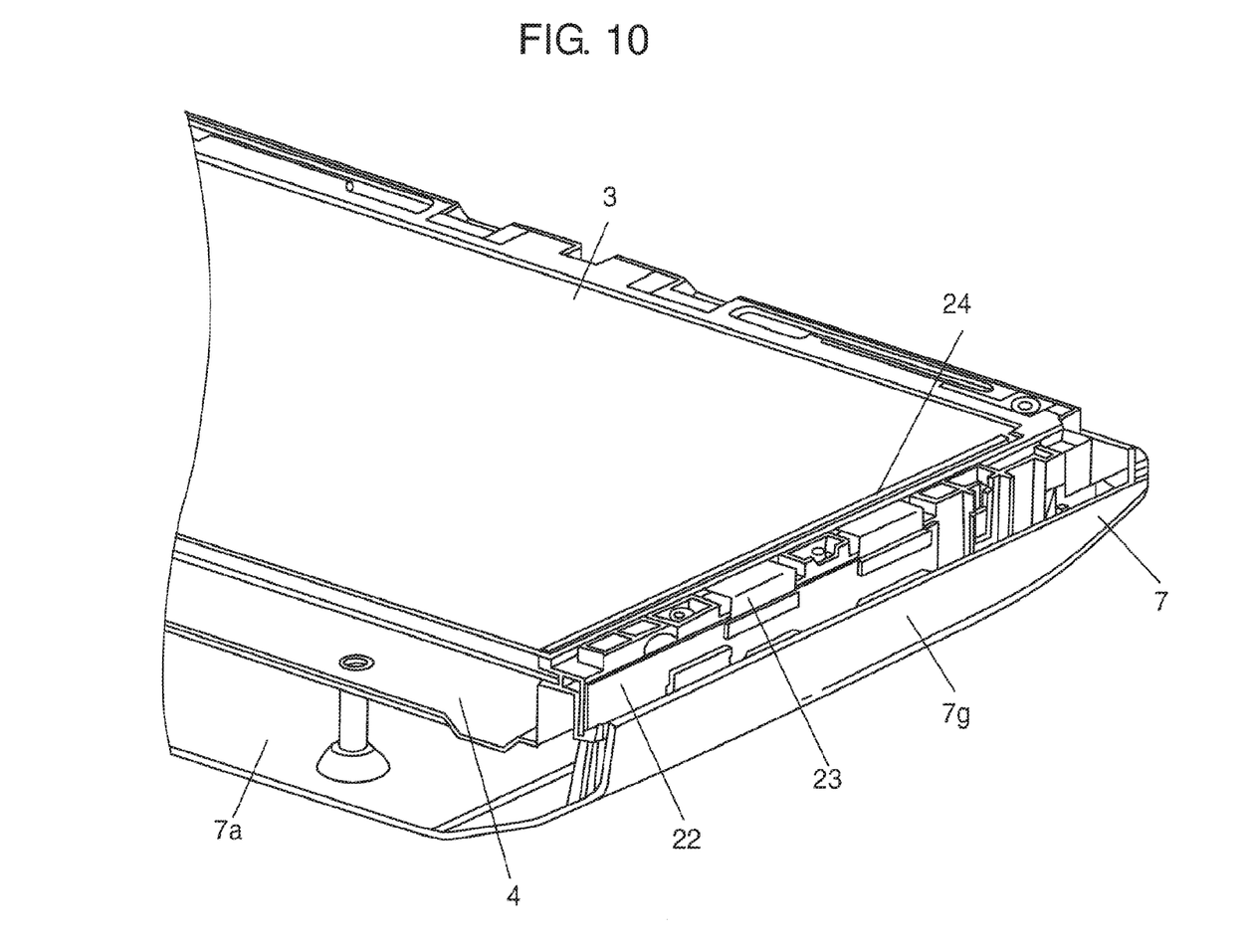
FIG. 10 is an enlarged perspective view of main parts of the liquid crystal display device.

FIG. 10 is an enlarged perspective view of the main parts of the liquid crystal display device. As illustrated in FIG. 10, in the present embodiment, in panel driving circuit board 22 for electrically connecting liquid crystal display panel 3 to the circuit board of the signal processing circuit block 8 disposed on the back side of backlight unit 4, panel driving circuit board 22 is electrically connected to liquid crystal display panel 3 via a flexible wire board 24. In addition, notches are provided at the side wall of back cabinet 7 corresponding to connector 23 such that connectors 23 between flexible wire board 24 and panel driving circuit board 22 are exposed to outside from side wall 7g of back cabinet 7.

With this configuration, liquid crystal display panel 3 can be easily connected to panel driving circuit board 22 when assembly is performed.

In addition, although, in the example illustrated in FIG. 10, only connectors 23 between liquid crystal display panel 3 and panel driving circuit board 22 are configured to be exposed to the outside from side wall 7g of back cabinet 7, connection portions between the circuit board of signal processing circuit block 8 and panel driving circuit board 22 may be configured to be exposed to outside from side wall 7g of back cabinet 7.

As such, in the present embodiment, in the liquid crystal display device which includes the casing having back cabinet 7, liquid crystal display panel 3 and backlight unit 4 accommodated in the casing, and the circuit board forming the driving circuit for displaying an image on liquid crystal display panel 3, back cabinet 7 has space 7a which can accommodate backlight unit 4 and the circuit board, backlight supporters 7b and 7c supporting backlight unit 4 are provided on the inner wall surface forming space 7a, liquid crystal display panel 3 is disposed in the opening of space 7a of back cabinet 7, and connectors 23 between liquid crystal display panel 3 and panel driving circuit board 22 are exposed to outside from side wall 7g of back cabinet 7.

Thereby, backlight unit 4 and liquid crystal display panel 3 are sequentially incorporated into back cabinet 7 with respect to back cabinet 7, and thereby a finished product can be assembled. For this reason, the display module including backlight unit 4 and liquid crystal display panel 3 is assembled, and assembly is easier than in a case where a circuit board having liquid crystal display panel 3 and driving circuits of the backlight unit mounted thereon is installed and is then accommodated in the casing.

Further, connectors 23 between liquid crystal display panel 3 and panel driving circuit board 22 are exposed to the outside from side wall 7g of back cabinet 7, and thus liquid crystal display panel 3 can be easily connected to flexible wire board 24 when assembly is performed.

The invention claimed is:

1. A display device comprising:
   an outermost casing composed of a front cabinet and a back cabinet;
   a flat display panel installed in the outermost casing;
   a backlight unit disposed on a back side of the flat display panel;
   a signal processing circuit board that controls an image signal output to the flat display panel, the signal processing circuit board being disposed on a back side of the backlight unit; and
   a panel driving circuit board electrically connecting the signal processing circuit board to the flat display panel and controlling driving of the panel,
   wherein the front cabinet is fixed to the back cabinet,
   wherein the back cabinet has a space which accommodates the backlight unit and the signal processing circuit board therein, and a backlight supporter which supports the backlight unit on an inner wall surface forming the space,
   wherein the flat display panel is disposed in an opening of the space of the back cabinet, and a connector between the flat display panel and the panel driving circuit board is exposed to outside from a side wall of the back cabinet when viewed from a side of the back cabinet without the front cabinet, and
   wherein a connection portion between the signal processing circuit board and the panel driving circuit board is exposed to the outside from the side wall of the back cabinet when viewed from the side of the back cabinet without the front cabinet.

2. The display device of claim 1, wherein
   the front cabinet is fixed to the back cabinet with screws.

3. A method of assembling a display device, the display device comprising:
   an outermost casing composed of a front cabinet and a back cabinet;
   a flat display panel installed in the outermost casing;
   a backlight unit disposed on a back side of the flat display panel;
   a signal processing circuit board that controls an image signal output to the flat display panel; and
   a panel driving circuit board electrically connecting the signal processing circuit board to the flat display panel and controlling driving of the panel,
   the method comprising steps of:
   putting the backlight unit in a space of the back cabinet, a backlight supporter which supports the backlight unit on an inner wall surface forming the space, the signal processing circuit board being disposed on a back side of the backlight unit;
   putting the flat display panel in an opening of the space of the back cabinet;
   connecting the flat display panel to the panel driving circuit board, a connector between the flat display panel and the panel driving circuit board being exposed to outside from a side wall of the back cabinet when viewed from a side of the back cabinet; and
   fixing the front cabinet to the back cabinet.

4. The method of claim 3, further comprising a step of:
   connecting the signal processing circuit board to the panel driving circuit board, a connection portion between the signal processing circuit board and the panel driving circuit board being exposed to the outside from the side wall of the back cabinet when viewed from the side of the back cabinet before the front cabinet is fixed to the back cabinet.

* * * * *